April 11, 1961        J. R. ALTIERI        2,979,683
CONTINUOUSLY ROTATABLE MULTITURN POTENTIOMETER
Filed April 7, 1960        3 Sheets-Sheet 2

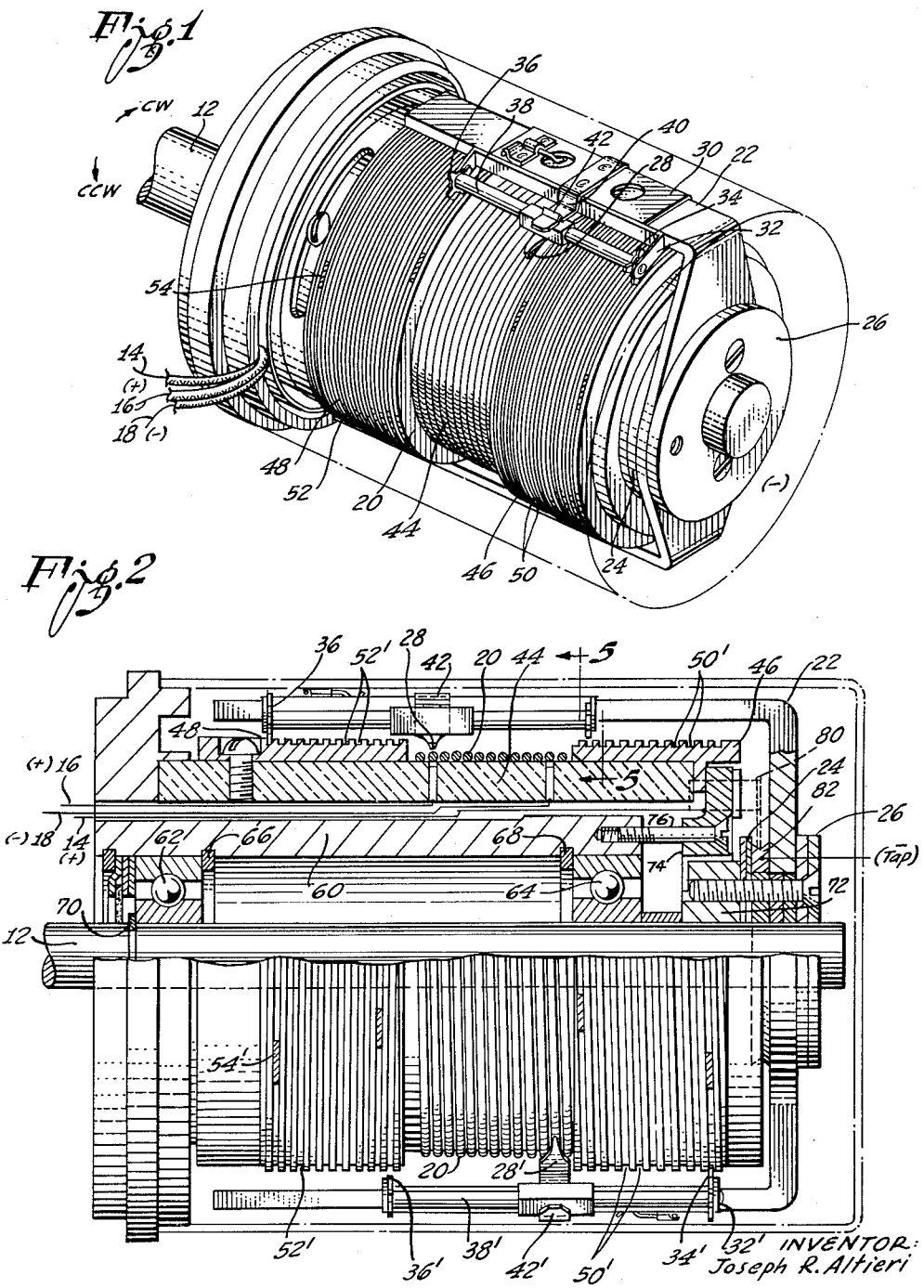

INVENTOR:
Joseph R. Altieri

Marvin H. Kleinberg
Attorney.

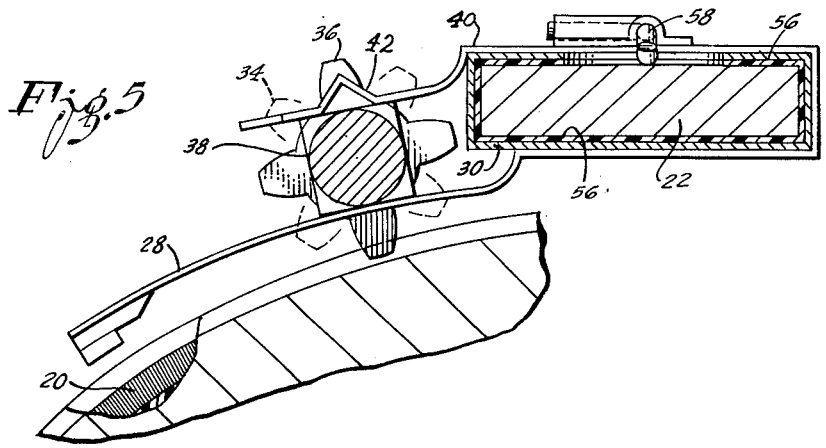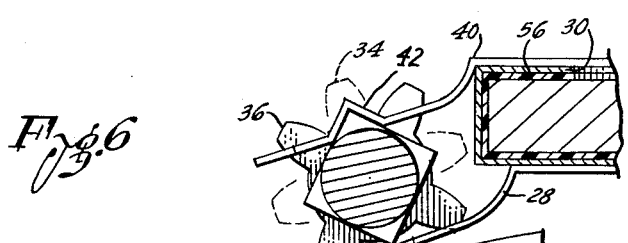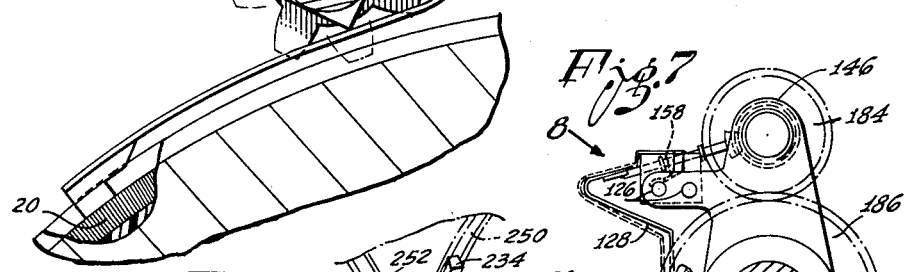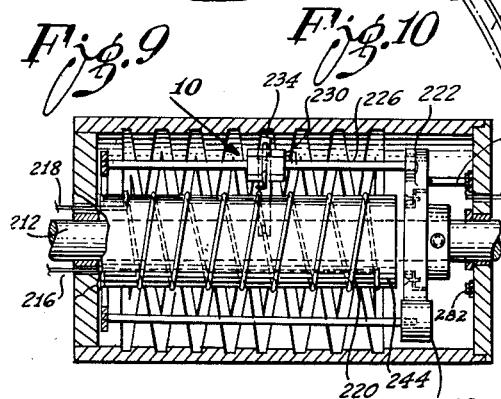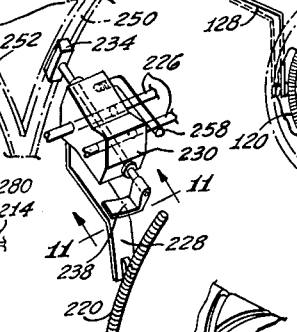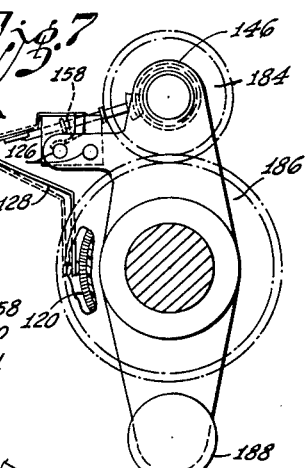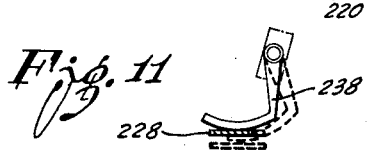

2,979,683

CONTINUOUSLY ROTATABLE MULTITURN POTENTIOMETER

Joseph R. Altieri, Yonkers, N.Y., assignor, by mesne assignments, to USECO, Inc., a corporation of Colorado Filed Apr. 7, 1960, Ser. No. 20,781

13 Claims. (Cl. 338—143)

This invention relates to multiturn potentiometers, and more particularly to continuously rotatable, precision, multiturn helical potentiometers in which a pair of counter wound driving helices are used to impart a reciprocating motion to a wiper assembly.

The term "multiturn helical potentiometer" denotes a particular class of potentiometer which is operative to exhibit an impedance that is variable in accordance with the position of an associated input shaft that rotates through a plurality of revolutions. Potentiometers of this type have relatively high resolution expressed as a percentage of the entire resistance range and may provide an impedance which varies linearly with shaft rotation, or, in accordance with some other predetermined function of position of the input shaft.

The potentiometer resistive element is generally in the form of a compound right cylindrical helix of fine resistance wire which is formed by winding the resistance wire over an insulating mandrel which is in turn coiled to provide a cylinder whose axis is either coincident with or parallel to the axis of the input shaft. The wiper element, in order to contact the resistive element, must therefore follow a helical path tangential to the resistive helix as the input shaft rotates. In the past, this has been achieved either by a lead screw arrangement which moves the wiper assembly as it rotates with the input shaft or by the use of a guide shoe, connected to the wiper, which engages and tracks either the resistive helix or a guide helix which is interlaced between adjacent turns of the resistive helix.

The use of a guide shoe over the resistive helix is generally an unsatisfactory expedient because of the deleterious effects of increased wear on the resistance element, the introduction of dirt and foreign matter into the helix, and the possibility of dislocating or deforming the individual turns of the resistance wire. These problems are easily avoided by use of a lead screw arrangement which, in turn, presents different problems. For example, limit stops must be provided to prevent overtravel of the wiper assembly. These stops are frequently interposed in the path of wiper travel, and the wiper may be unduly worn or damaged by repeated collisions with the stop elements.

Furthermore, in both of these potentiometers it is necessary to reverse the direction of rotation of the input shaft once the resistive helix has been traversed in order to return the wiper assembly to the starting point. Moreover, if it is desired to make the device continuously rotatable, a coupling assembly, involving clutches and gear trains which are complex, expensive and seldom accurate to requisite degree of precision, is required to connect the source of rotation to the input shaft so that a continuous input rotation in one direction can be used to return the wiper assembly after each traversal of the resistive element.

The present invention avoids these difficulties of the prior art and provides a continuously rotatable, stopless, multiturn potentiometer. According to the underlying concepts of the invention, a pair of counter wound helices are used for driving and guiding the wiper in the requisite spiral path. Included in the follower assembly, which couples the wiper mechanism to the driving helices, is a cam arrangement for lifting the wiper away from the resistive helix while the wiper assembly is moving in one axial direction and for enabling contact when the assembly is moving in the other axial direction.

In a preferred embodiment of the invention, the resistive helix is wrapped on a cylindrical core on the ends of which there is mounted a pair of drums coaxial therewith, each drum having a driving helix in the form of a track cut into the periphery thereof. One of the drums has a left hand helix and the other has a right hand helix, the pitch of the driving helices corresponding to the pitch of the resistive helix.

The wiper assembly includes a traveling carriage from which is suspended a wiper element. Connected to the carriage is a cam shaft and a pair of follower elements which are alternately engageable in the drive helices. Means are provided for simultaneously disengaging one of the followers and engaging the other follower when the carriage and wiper is at one end of the resistive helix, the arrangement being reversed at the other end of the helix. The cam shaft pushes the wiper into electrical contact with the resistive helix during travel in one axial direction and releases the wiper during travel in the opposite axial direction. Continuous rotation of the input shaft thus produces a first output signal during an operating cycle of ten revolutions and a second output signal during a "non-operating" cycle of the next ten revolutions.

In an alternative embodiment of the invention, the driving helix corresponding to the return or inoperative direction has a greater pitch than the driving helix corresponding to the operative direction of wiper travel. Consequently, the wiper assembly is returned to the operative start position in less than ten turns, this feature being especially valuable in applications in which two potentiometers are ganged together and overlapped to provide a continuously varying output signal, or, where a complete cycle of less than twenty turns is desired. If two such potentiometers are ganged, the wiper of one potentiometer is tracking its resistive helix while the wiper of the other is disengaged and on a return traverse. When the helices are differentially wound, therefore, a brief period of overlap is provided during which both wipers are in contact with their respective resistances, thereby assuring continuous, uninterrupted operation.

A further embodiment obviates the need to use more than one potentiometer to provide an uninterrupted output by employing a second wiper assembly which is also connected to the input shaft and which starts an operative traverse when the first wiper begins a return traverse. Inasmuch as the same drive helices and resistive helix are common to both wipers, it follows that this embodiment also obviates any need to match potentiometers for identical impedance characteristics.

In another alternative embodiment, the two guide drums are replaced by a single, level-wind shaft which is driven from the rotating input shaft, the two different attitudes of the level-wind follower during traverse and return traverse being used to provide a cam surface which enables the wiper to contact the resistive helix when the wiper assembly moves in a first axial direction. When the follower drives the assembly in the other axial direction, on the other hand, the wiper is cammed away from the resistive helix. As a variation of this embodiment, a differential level-wind shaft is employed in which the pitch in one direction is greater than the pitch in the other direction, thereby providing a faster traverse in one of the directions and further providing an overlapped output signal in the manner described previously.

Accordingly, it is an object of the invention to provide a continuously rotatable multiturn potentiometer having a pair of counter wound helices for guiding and driving the wiper assembly.

It is a further object of the invention to provide a continuously rotatable, multiturn potentiometer having a pair of counter wound helices of different pitch for guiding and driving the wiper assembly at one speed to traverse the resistive helix and at a different speed to return to a start position.

A still further object of the present invention is having a level-wind shaft having a pair of counter wound guide helices for guiding and driving the wiper assembly.

An additional object of the invention is to provide a potentiometer having a level-wind shaft with two counter wound helices of different pitch for reciprocating the wiper assembly at different speeds in each direction.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1 is a perspective view of a continuously rotatable potentiometer with the case removed to show the arrangement of the component parts;

Figure 2 is a side view, partly in section, of a potentiometer similar to that of Figure 1 and having two wiper assemblies;

Figure 5 is a sectional view of the device of Figure 2 taken along the line 5—5 in the direction of the appended arrows showing the wiper, carriage, and the follower assemblies in greater detail;

Figure 6 is a side view of the assembly of Figure 5 with the follower and cam assembly arranged in an alternate stable position;

Figure 7 is a detailed view of a portion of Figure 3 taken along line 7—7 in the direction of the appended arrows;

Figure 8 is an isometric view of a portion of the structure of Figure 7 indicated by the number 8 in Figure 7;

Figure 9 is another alternative embodiment of a potentiometer in which the guide helix is molded in the potentiometer case;

Figure 10 is a view of a portion of Figure 9 identified by the reference number 10; and Figure 11 is a sectional view of a portion of the cam structure of Figure 10 taken along the line 11—11 in the direction of the appended arrows.

Figure 3:
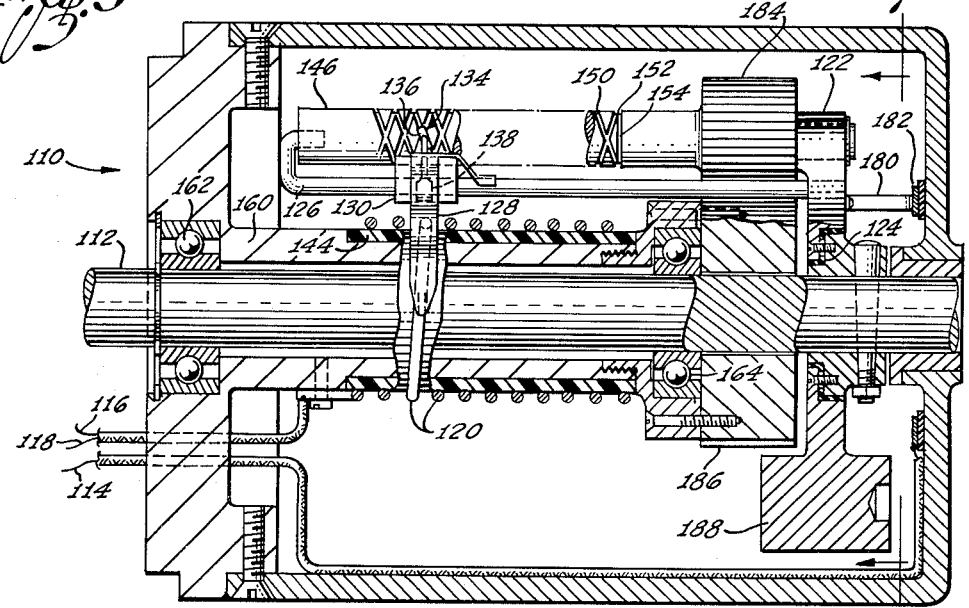
Figure 3 is a side section view of an alternative potentiometer in which a level wind-shaft is used to drive the wiper assembly.

With reference now to the drawings, there is shown in Figure 1 a potentiometer in accordance with the invention having a single wiper element which follows a resistive helix and which is rotatable in accordance with rotation of an input shaft 12 which, in turn, extends through the potentiometer and is journaled within a hub assembly, as is best seen in Figure 2 described below. An output conductor 14 is connected to the wiper element and provides an output signal which is a function of the resistive impedance of the potentiometer, the rotational position of the input shaft 12, and the potential impressed across a pair of input conductors 16 and 18 which are connected to opposite ends of the resistive helix 20.

Fixedly mounted to, and rotatable with the input shaft 12, is a wiper arm 22 which is electrically isolated from the input shaft 12 by a pair of insulating washers 24, 26, so that the arm may be included in the conductive path of the electrical output signal from the resistive helix. A wiper element 28 is suspended from a wiper carriage 30 which is slidably mounted on wiper arm 22 and which is movable in a direction parallel to the axis of the input shaft 12. The wiper element 28 is a moving electrical tap which contacts the resistive helix to signal the potential of the helix at the point of contact.

As best seen in Figures 5 and 6, which are explained in greater detail below, a follower mechanism includes a mounting bracket 32 and a pair of follower elements 34, 36, extending from the wiper carriage 30. The follower elements are positioned in a bracket 32 and are connected to each other by a cam shaft 38 having a square cross section at the middle portion. The wiper element 28 is an extended portion of a strip of resilient metal that is wrapped about the carriage assembly 30 and extends outward from the upper part to act as a detent spring 40 which is biased against the cam shaft 38 to maintain the shaft in one of two stable positions, relative to the square portion of the cam shaft. In one stable configuration, the detent spring 40 is positioned flat against one of the plane faces of the cam shaft, substantially as shown in Figure 5. One of the longitudinal edges of the cam is engaged by a matching V-shaped deformation 42 in the detent spring 40 to provide the alternate stable position as seen in Figure 6.

For the square cam shaft shown, the followers 34 and 36 are of a cruciform shape and are positioned to be offset from each other by 45°. That is, one of the followers, for example, follower 36 as viewed in Figure 1, is aligned with its arms perpendicular to the faces of the cam shaft 38, and the other follower 34 is rotated through 45°, its arms being aligned parallel to the diagonals of the cam shaft 38. Thus in each stable position of the cam shaft 38, at least one follower arm is aligned to coincide with a radial line extending from the axis of the input shaft 12.

The resistive element 20 is wrapped in a helix that is pitched to the right about a drum 44, coaxial with the input shaft 12, in a manner similar to that shown and described in Patent No. 2,871,326 for "Precision Potentiometers," granted to J. W. Weidenman et al., on January 27, 1959. Also coaxial with the input shaft 12 and adjacent the resistive helix 20 are a pair of guide drums 46, 48, mounted on opposite ends of drum 44 and a pair of respectively counter wound guide or driving helices are formed in the periphery of the guide drums 46, 48. In the embodiment of Figure 1, the degree of pitch of both guide helices is identical to that of the resistive helix 20, the guide helix 50 on the right hand drum being pitched to the right and the guide helix 52 on the left hand drum being pitched to the left. Thus the right follower 34 engages and tracks the right pitched helix 50 and the left follower 36 engages and tracks the left pitch helix 52. In operation, as described in more detail below, the followers are alternately engaged, the disengagement of one causing the engagement of the other.

To define the limits of travel of the carriage in each of the axial directions, four stop elements 54 are set in the grooves of the guide helices 50, 52, at locations which correspond to the wiper element 28 reaching the ends of the resistive helix 20. Each stop element 54 can be either a pin or, as shown in Figure 1, a deposit of epoxy which blocks the helix. When a follower tracking in the helix encounters the stop, the wiper arm continues to move but a rotational motion is imparted to the follower about its own axis. The cam shaft 38 is thereby rotated and the opposite follower then engages its guide helix. The mechanism is operative without regard for the direction of motion of the input shaft 12, the stops 54 being located so that the wiper element 28 is placed into electrical contact at one of the electrical ends of the resistive helix 20, and is removed at the other electrical end.

Turning next to Figures 5 and 6, there are shown views of portions of the wiper and carriage assemblies of the illustrated embodiments. The detailed construction of the wiper and detent spring assembly of the potentiometers of Figures 1 and 2 cooperating with the cam shaft and resistive helix is clearly illustrated in Figures 5 and 6. In Figure 5, which is a side sectional view of the apparatus of Figure 2 taken along 5—5 in the direction of the appended arrows, the wiper carriage assembly 30 is shown together with the wiper element 28, the detent spring portion 42, the cam shaft 38 and the follower elements 34, 36 and their spatial relation to the follower arm 22 and the resistive helix 20 can be clearly seen. A lining 56 is interposed between the carriage assembly 30 and the wiper arm 22 which lubricates and electrically isolates the sliding surfaces. In order to assure a good electrical contact from the wiper element 28 to the wiper arm 22, a hole is cut through the carriage assembly 30 and a wiper slide 58, which is fastened to the carriage, extends through the hole to slide upon the wiper arm 22 in good electrical contact. As can be seen from Figure 5, with the cam shaft 38 in one of its stable positions, the upper surface of the cam shaft 38 bears against the flat surface of the detent spring portion 42 and the lower cam shaft surface is substantially parallel to the wiper element 28. In the alternate stable configuration, best seen in Figure 6, the cam shaft is shown rotated through 45° and, as shown, a corner of the cam shaft is engaged in the V-shaped notch of detent portion 42 which is provided for that function, at the same time the wiper element 28 is cammed into contact with the resistive helix 20 by the increased diameter of the cam shaft in that position.

In operation, continuous rotation of the input shaft 12 in one direction rotates the connected wiper arm 22 in the same direction about the resistive helix 20 and the counter wound guide helices 50 and 52. With reference to Figure 1, assume first, that the input shaft is rotated in the direction marked by the arrow CW and let us assume that to be the clockwise direction. If the left hand follower 36 is initially in engagement with the left hand helix 52, then carriage 30 is in motion to the right as viewed in Figure 1 and the wiper element 28 is biased out of engagement with the resistive helix 20. As this clockwise rotation continues, the wiper carriage 30 travels until the left hand stop member 54 of the left helix 52 is encountered by the left follower 36. The wiper arm continues to move past the stop, but the projecting arm of the follower 36 is blocked, rotating the cam shaft 38, until the arm is out of the guide helix. The detent spring portion 40, then continues the rotation of the cam shaft 38 until the edge of the cam shaft is engaged in the matching groove 42 of the spring.

Simultaneously, with rotation of the cam shaft 38, an arm of the right hand follower 44 is rotated into engagement with the right hand helix 50 and the follower element 28 is cammed into contact with the resistive helix 20. As the input shaft continues to turn in the same, or clockwise direction, the wiper element 28 remains in continuous electrical contact with the resistive helix 20 and the wiper carriage 30 is transported laterally to the left as viewed in Figure 1 simultaneously with its rotational motion.

In prolonged unidirectional rotation of the input shaft 12, the wiper carriage 30 will reciprocate back and forth along the wiper arm 22 parallel to the axis of the input shaft. In successive multiturn cycles (in this embodiment, ten turns per cycle) the wiper carriage 30 is transported first by one of the driving helices and then by the other, alternately. Thus the wiper element is cammed into engagement with the resistive helix when the carriage moves to the left and the wiper element is disengaged from the resistive helix when the carriage moves to the right. It will be readily seen that the potentiometer works equally well when continuously rotating in the reverse or counterclockwise direction as indicated by the arrow marked CCW. Here, the wiper engages the resistive helix at the left hand end and tracks in contact from left to right while the right hand follower is in engagement with the right hand guide helix.

The signal output of the potentiometer, relative to the position of the input shaft, exhibits a high or open circuit impedance for ten revolutions of the shaft and for the next ten turns indicates a continuously varying impedance as the resistive helix is traversed. It is, of course, well within the scope of the present invention to provide special resistive helices which generate other than linear functions of resistance with shaft rotation, such as exponential, sine, cosine, or others.

It will be recognized by those skilled in the art that if a continuous output is desired, which is not to be interrupted during the time that the wiper element is returned to the start position, a second potentiometer may be driven from the same source of rotational input. By adjusting the second potentiometer to be operative while the first potentiometer is inoperative, such an arrangement will provide a continuous cyclical output in accordance with input shaft rotation and, of course, will be bidirectionally operative.

The same result, however, could be accomplished with a slight modification of the potentiometer of Figure 1 and such modification is shown in Figure 2, which is an alternative embodiment of a potentiometer of the present invention. The potentiometer of Figure 2 for the most part is identical to that of Figure 1 and accordingly, the same reference numerals have been used except where parts have been slightly modified but correspond to similar parts of Figure 1, in which case the same reference numeral is used with a prime affixed.

Figure 2 is a side view of a potentiometer, partially in section, which illustrates the internal construction in somewhat greater detail. As seen in Figure 2, the input shaft 12 is journaled within a metallic hub 60 by a pair of ball bearings 62 and 64, respectively, the outer races of which engage a pair of C-rings 66, 68 which are seated in slots in hub 60. The inner race of bearings 62, 64, in turn, are respectively engaged by a retainer ring 70 seated in a slot in shaft 12, and by a mounting ring 72 which is affixed to shaft 12 by a set screw or the like (not shown). Mounting ring 72 insulatively supports the wiper arm 22 providing a rigid connection with the input shaft 12.

The resistive helix 20 is wrapped about a drum 44 which is mounted on and concentric with the hub 60, the drum 44 being held in place by a collar 74 and several screws, 76, only one of which is shown. The right hand drum 46 carrying the right hand helix 50 is fastened to the hub by an inwardly extending shoulder between the drum 44 and the collar 74 while this left hand guide drum 48 having the left hand helix 52' is fastened to the drum 44 by a set screw 78. An electrical potential is impressed across the coils of the resistive helix 20 by conductors 16 and 18 substantially as shown, which tap the helix at opposite ends thereof through openings in the drum 44 while the output signal conductor 14 is connected to the collar 74 which, through a brush 80 and slip ring 82, is conductively connected to the wiper arm 22 and thence to the wiper element 28.

In the embodiment of Figure 2, a second wiper carriage 30', carrying a second wiper element 28', is mounted on the opposite half of wiper arm 22. The second wiper assembly is substantially identical to the first, described above, and includes a second follower and cam shaft assembly which is carried by the carriage 30'. The wiper elements 28, 28' are alternatively engageable with the resistive helix 20 so that when the first wiper element 28 is tracking the resistive helix, the second wiper element 28' is disengaged. Further, when the drive to the first carriage switches from the left hand helix to the right hand helix, as rotation of the wiper arm continues, the drive to the second carriage switches from the right helix to the left helix. If the transition from the first wiper element to the second wiper element causes a discontinuity in the output signal because of the relative position of the contact points of the wiper elements 28, 28', the device of Figure 2 can be further modified by extending the length of the wiper elements. The operation of the potentiometer of Figure 2 is comparable to the operation of the potentiometer of Figure 1, except that a new cycle of operation commences every 10 revolutions rather than every 20th revolution, with no dwell time between cycles.

By way of further modification, the driving helices of Figure 2 have been altered slightly from the embodiment of Figure 1. In particular, the right hand helix 50' has been lengthened to encompass 10½ turns without alteration of the pitch but the pitch of the left hand helix 52' has been increased so that the wiper assembly traverses an axial distance equivalent to 10½ turns of the resistive helix, in only 9½ turns of the input shaft. Consequently, a ½ revolution of "overlap" is provided during each 20 turn cycle which assures uninterrupted output and proper phasing of the wiper element with respect to the resistive helix.

Turning now to Figure 3, there is shown in side sectional view an alternative embodiment of a multiturn potentiometer according to the present invention having an input shaft 112 rotatably mounted therein. An output signal, produced on output conductor 114, is a function of the displacement of the input shaft 112, and as in the embodiments described above, is some fraction of the difference in potential that is applied on input conductors 116, 118 across a helical resistive element 120 similar to the resistive element 20 of Figures 1 and 2 above.

A wiper arm 122 is connected to the input shaft 112 to rotate therewith through an insulating collar 124 which is pinned to the shaft and to the arm. A guide rod 126, fastened to the arm 122, is positioned adjacent the resistive helix 120 and parallel to the axis of the input shaft 112. A wiper carriage 130, carrying a wiper element 128, is slidably mounted on the guide rod 126 and provides a sliding tap to contact the resistive element 120. As best seen in Figures 7 and 8, a follower assembly 134 is connected to the wiper carriage 130 and includes a cam surface 138 for selectively engaging and disengaging the wiper element 128 from resistive element 120.

Rotatably mounted on the wiper arm 122 is a level-wind shaft 146 which is supported at its other end by an extension of the guide rod 126. The level-wind shaft has formed in its surface a pair of respectively counter wound guide and driving helices which, when the level-wind shaft is rotated, drive the wiper carriage 130 reciprocatingly in the axial direction. A first helix 150 drives the follower and carriage to the right as viewed in Figure 3 and a second guide helix drives the assembly to the left. At the ends of both helices, there is a common connecting groove 154 which switches the follower from helix to helix.

A metallic hub 160 is provided in which the input shaft 112 is journaled and over which a non-conductive drum 144 is placed to support the helical resistive element 120 substantially as shown in Figure 3. A pair of ball bearings 162, 164, rotatably support the input shaft 112 in the hub in a manner similar to that shown in the embodiment of Figure 2. A conductive brush 180 connected to the wiper arm 122 is electrically connected to the wiper element 128 for transmitting the potential at the point of contact through a slip ring 182 mounted on the inner surface of the case assembly to the output conductor 114.

The level-wind shaft 146 is carried about the hub 160 by the rotation of the wiper arm 122 and is rotated about its own axis by a planet gear 184 that meshes with a stationary sun gear 186 which is threaded onto the hub 160 and pinned. It should be noted at this juncture, that the drawing can only be regarded as illustrative and is not drawn to accurate scale. For example, in the embodiments of Figures 3 and 4, the gear ratio is selected to be 1:1 to rotate the level-wind shaft once with each revolution of the wiper arm and in ten turns of the input shaft 112, the level-wind shaft 146 rotates ten times and the carriage assembly 130 completes half of its complete reciprocating cycle. The pitch of the right guide helix 150 is calculated to maintain the wiper in concentric alignment with the resistive helix. A counter-weight 188 is fastened to the arm opposite the wiper assembly to provide dynamic balance during rotation of the input shaft.

Turning next to Figures 7 and 8, Figure 7 is a detailed, side sectional view of the wiper and carriage assembly of Figure 3 and the mounting of the carriage in relation to the level-wind shaft and resistive helix is clearly shown while Figure 8 is a perspective view of the follower assembly portion of Figure 7, as seen along the arrow 8. It will be recognized that when the follower element 134 is tracking one of the guide helices, for example, the helix for driving the assembly to the right (as shown in Figure 8), the cam surface 138 is positioned substantially parallel to the wiper element 128. However, when the direction of axial movement changes, and the other helix has engaged the follower element 134, the cam surface 138 is rotated through a small angle and the wiper element is cammed out of contact with the resistive helix 120 as shown by the dashed outline in Figure 7.

In operation, as the input shaft rotates, the level-wind shaft and wiper carriage rotate about the resistive helix 120. Whent he input shaft is rotating in the clockwise direction, as viewed from the right end, the helix driving the wiper assembly to the right also cams the wiper element into contact with the resistive helix. When the helix has been completely traversed, the follower mechanism engages the other driving helix and the follower mechanism cams the wiper element out of contact with the resistive helix for return traverse. In continued operation, the potentiometer of Figure 3 provides a cyclical output during which a variable impedance is exhibited for ten turns of the input shaft followed by a ten turn period of dwell or infinite impedance.

As pointed out above, if a continuous output is desired, two potentiometers may be connected to the same source of rotation and ganged to be alternately operable. However, the same result could be achieved by a modification, best seen in Figure 4, in which two level-wind shafts are carried by the wiper arm 122. Further, one of the driving helices of each level-wind shaft has a greater pitch than the other. In this embodiment, the driving helices which drive the followers to the right as the input shaft rotates clockwise (viewed from the right hand end) require 10½ turns to transport the wiper carriages from end to end, contacting 10½ turns of the resistive helix in the process. The other helices require only 9½ turns to return the wiper carriages to the start position while the wiper element is cammed out of engagement with the resistive helix. A slight period of overlap is thus provided during which one wiper assembly is in contact with the resistive helix at one extreme end when the other wiper is brought into contact with the resistive helix at the other extreme end.

Still another alternative embodiment of a stopless, multiturn potentiometer is shown in Figure 9. In this embodiment, the guide or driving helices are located in the inner surface of the case surrounding the potentiometer element. As best seen in Figures 9 and 10, these helices form a pair of counter wound grooves 250, 252, in the case, and a follower element 234 carried by a wiper arm 222 is engaged in the groove. The wiper arm 222 is attached to an input shaft 212 in a fashion similar to that of the other embodiments and a wiper carriage 230 is slidably mounted upon a pair of guide rods 226 which are attached to the wiper arm 222 and which rotated about the resistive helix 220. As the input shaft 212 rotates, the wiper assembly 230 describes a helical path which, in one direction closely parallels the helix of the resistive winding 220 and in the opposite direction, crosses that path. A counter weight element 288 is mounted on the wiper arm 222 opposite the guide rod 226 to provide dynamic balance. As with the embodiments of Figures 3 and 4, the follower element 234 is connected to a camming surface 238 which selectively engages the wiper element 228 in and out of contact with the resistive helix 220 and, as with the embodiments of Figures 3 and 4, a brush 280, in contact with a slip ring 282 in the end of the case, provides the electrical connection to an output conductor 214. A detailed view of the wiper carriage 230 and the follower mechanism 234 is seen in Figures 10 and 11 which show the cam surface 238 in its two positions of contact with the wiper element 228. Figure 11 is a front view of the apparatus of Figure 10 taken along the line 11—11 in the direction of the appended arrows, and as seen in Figure 10, a contact slider 258 electrically connects the wiper element 228 to the guide rods 226 upon which the carriage 230 is movable, thereby completing the electrical circuit between the output conductor 214 and the resistive helix 220.

Figure 4:
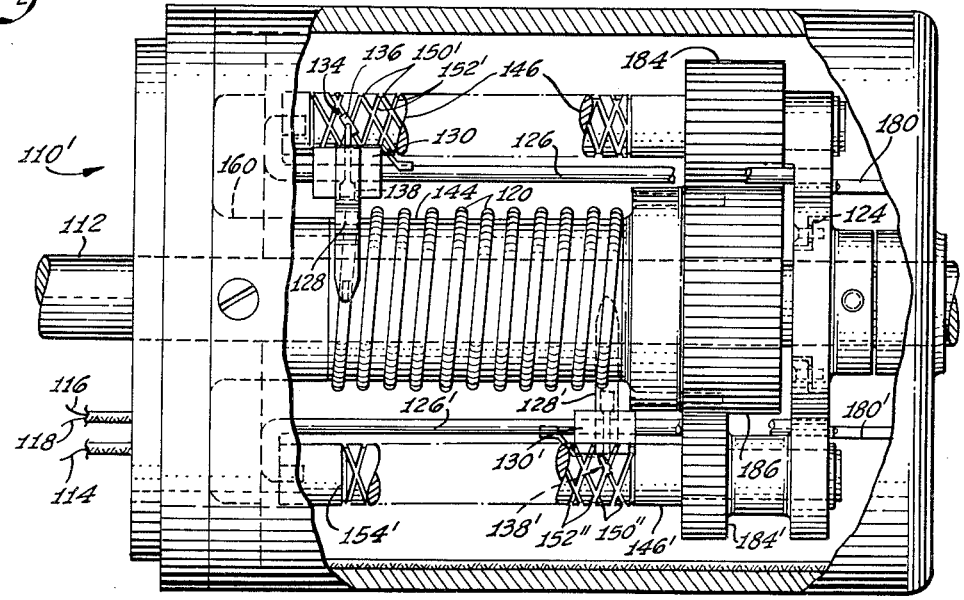
Figure 4 is a side view, partly in section, of a potentiometer similar to that of Figure 3 in which a second level-wind shaft drives a second wiper assembly.

In accordance with the teachings of the present invention, the counter wound helical grooves of the potentiometer of Figure 10 may either have the same pitch or may have different pitches, to provide faster traverses in one direction than the other, as explained in connection with Figures 2 and 4 above. Also, and in accordance with the teachings set forth hereinabove, a second wiper assembly may be added to the structure of Figure 9 without appreciable alteration of the mechanism. Such a second wiper assembly could easily be mounted in place of the counter weight 238 on the wiper arm 222 and operated in the manner shown and described in connection with the embodiments of Figures 2 and 4, above.

Many other modifications will readily occur to those skilled in the art. For example, it is a relatively simple procedure to provide a level wind mechanism wherein the opposing guide helices have grooves of different depths so that the depth of the groove itself can be used as a direct mechanical means for bringing wiper elements in and out of conductive engagement with the resistive helix, and such a modification would be well within the scope of the present invention. Accordingly, the breadth of the invention should not be limited by the description or the drawings, but should be limited only by the claims which are appended below.

Thus, there has been shown, several embodiments of stopless multiturn helical potentiometers which use counter wound helices for guiding and driving the wiper assemblies and which provide simple mechanical assemblies for controlling the wiper element in accordance with the direction of motion.

What is claimed as new is:

1. A continuously rotatable multiturn potentiometer comprising: a resistive helix having an axis; support means for said helix; a wiper assembly concentrically rotatable about the axis of said resistive helix, said wiper assembly including a wiper element axially movable with respect to said resistive helix and selectively engageable with said helix to provide a movable electrical tap point to said resistive helix; wiper reciprocating means including means for rotating said wiper assembly, a pair of counter wound driving helices and means for alternately engaging said driving helices to drive said wiper assembly in respectively opposite axial directions; and wiper control means connected to said wiper reciprocating means for engaging said wiper element in electrical contact with said resistive helix when said wiper assembly is being driven in one of said axial directions and for disengaging said wiper element from electrical contact with said resistive helix when said wiper assembly is being driven in the other of said axial directions.

2. The potentiometer of claim 1 above wherein one of said driving helices has a pitch greater than the other of said driving helices for driving said wiper assembly faster in said other axial direction.

3. Apparatus according to claim 1 further including a cylindrical case for enclosing the potentiometer, said case having said pair of driving helices formed on the inner surface thereof.

4. Apparatus according to claim 3 wherein said wiper assembly further includes a second wiper element axially movable with respect to said resistive helix and selectively engageable with said helix alternatively with said first recited wiper element.

5. A continuously rotatable multiturn potentiometer comprising: a resistive helix having an axis; support means for said helix; a wiper assembly concentrically rotatable about the axis of said resistive helix, said wiper assembly including a wiper element axially movable with respect to said resistive helix and selectively engageable with said helix to provide a movable electrical tap point to said resistive helix; wiper reciprocating means including means for rotating said wiper assembly, a pair of drums axially aligned with said resistive helix, a pair of counter wound driving helices each on a different one of said drums, and means coacting with said drums for alternately engaging said driving helices to drive said wiper assembly in respectively opposite axial directions; and wiper control means connected to said wiper reciprocating means for engaging said wiper element in electrical contact with said resistive helix when said wiper assembly is being driven in one of said axial directions and for disengaging said wiper element from electrical contact with said resistive helix when said wiper assembly is being driven in the other of said axial directions.

6. Apparatus of claim 5 above wherein one of said driving helices has a greater pitch than the other for driving said wiper assembly faster in said other axial direction.

7. Apparatus of claim 5 above wherein said wiper assembly further includes a second wiper element axially movable with respect to said resistive helix and selectively engageable with said helix alternatively with said first recited wiper element.

8. A continuously rotatable multiturn potentiometer comprising: a resistive helix having an axis; support means for said helix; a wiper assembly concentrically rotatable about the axis of said resistive helix, said wiper assembly including a wiper element axially movable with respect to said resistive helix and selectively engageable with said helix to provide a movable electrical tap point to said resistive helix; wiper reciprocating means including a rotatable level-wind shaft and a pair of driving helices counter wound on said level-wind shaft, means for rotating said wiper assembly and said level-wind shaft in synchronism, and means for alternately engaging said driving helices to drive said wiper assembly in respectively opposite axial directions; and wiper control means connected to said wiper reciprocating means for engaging said wiper element in electrical contact with said resistive helix when said wiper assembly is being driven in one of said axial directions and for disengaging said wiper element from electrical contact with said resistive helix when said wiper assembly is being driven in the other of said axial directions.

9. The apparatus of claim 8 above wherein one of said driving helices has a greater pitch than the other of said driving helices for driving said wiper assembly faster in said other axial direction.

10. Apparatus according to claim 8 above wherein said wiper assembly further includes a second wiper element axially movable with respect to said resistive helix and selectively engageable with said helix alternatively with said first recited wiper assembly and wherein said wiper reciprocating means further includes a second rotatable level-wind shaft and a second pair of driving helices, said second level-wind shaft and pair of driving helices being substantially identical to said first recited level-wind shaft and pair of driving helices.

11. A continuously rotatable muliturn potentiometer comprising the combination of: a relatively fixed resistive helix; a wiper assembly rotatable about said resistive helix, said wiper assembly including first and second wiper elements axially movable with respect to said resistive helix; wiper reciprocating means including means for rotating said wiper assembly, a pair of counter wound driving helices, and means for alternatively engaging said driving helices to drive said wiper elements in respectively opposite directions; and wiper control means connected to said reciprocating means for contacting said first wiper element and said resistive helix and for separating said second wiper element from said resistive helix when said first wiper element is being driven in one of said directions and for separating said first wiper element from said resistive helix and contacting said second wiper element and said resistive helix when said first wiper assembly in being driven in the other of said directions.

12. Apparatus according to claim 11 above further including a case assembly for enclosing the potentiometer, said pair of driving helices being formed on the inner surface of said case assembly.

13. Apparatus according to claim 11 above further including a pair of drums adjacent to and coaxial with said resistive helix, each one of said pair of driving helices being formed on one of said pair of drums.

References Cited in the file of this patent
UNITED STATES PATENTS

| | | |
|---|---|---|
| 1,853,798 | Brownell | Apr. 12, 1932 |
| 2,675,451 | Tinus | Apr. 13, 1954 |